(12) United States Patent
Moerbe

(10) Patent No.: US 10,906,450 B2
(45) Date of Patent: Feb. 2, 2021

(54) ENVIRONMENT SENSOR SYSTEM IN A TWO-WHEELED VEHICLE

(71) Applicant: Robert Bosch GmbH, Stuttgart (DE)

(72) Inventor: Matthias Moerbe, Ilsfeld-Helfenberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/465,029

(22) PCT Filed: Oct. 5, 2017

(86) PCT No.: PCT/EP2017/075328
§ 371 (c)(1),
(2) Date: May 29, 2019

(87) PCT Pub. No.: WO2018/099637
PCT Pub. Date: Jun. 7, 2018

(65) Prior Publication Data
US 2019/0283659 A1 Sep. 19, 2019

(30) Foreign Application Priority Data
Nov. 30, 2016 (DE) .......................... 10 2016 223 761

(51) Int. Cl.
*B60Q 1/00* (2006.01)
*B60W 40/072* (2012.01)
(Continued)

(52) U.S. Cl.
CPC ......... *B60Q 1/0023* (2013.01); *B60W 40/072* (2013.01); *B60W 40/11* (2013.01);
(Continued)

(58) Field of Classification Search
CPC ............ B60Q 1/0023; B60Q 2300/132; B60Q 2300/322; B62J 11/00; B62J 6/02;
(Continued)

(56) References Cited

U.S. PATENT DOCUMENTS

2005/0247118 A1    11/2005   Suzuki
2009/0268478 A1    10/2009   James
(Continued)

FOREIGN PATENT DOCUMENTS

CN    102470909 A    5/2012
CN    202593694 U    12/2012
(Continued)

OTHER PUBLICATIONS

International Search Report for PCT/EP2017/075328, dated Jan. 3, 2018.

*Primary Examiner* — Kevin Quarterman
(74) *Attorney, Agent, or Firm* — Norton Rose Fulbright US LLP; Gerard Messina

(57) ABSTRACT

An environmental sensor system in a two-wheeled vehicle is capable of being coupled to the two-wheeled vehicle via a carrier unit, the carrier unit being realized so as to be pivotable about an axis of the two-wheeled vehicle and, when there is a deflection of the two-wheeled vehicle, being pivoted about the two-wheeled vehicle axis in a direction opposite to the deflection.

12 Claims, 2 Drawing Sheets

(51) Int. Cl.
*B60W 40/11* (2012.01)
*B62J 11/00* (2020.01)
*B62J 6/02* (2020.01)
*B62J 45/40* (2020.01)

(52) U.S. Cl.
CPC .............. *B62J 6/02* (2013.01); *B62J 11/00* (2013.01); *B60Q 2300/132* (2013.01); *B60Q 2300/322* (2013.01); *B60Y 2200/12* (2013.01); *B62J 45/40* (2020.02)

(58) Field of Classification Search
CPC ...... B62J 45/40; B60W 40/072; B60W 40/11; B60Y 2200/12
See application file for complete search history.

(56) References Cited

U.S. PATENT DOCUMENTS

| | | | | |
|---|---|---|---|---|
| 2015/0081168 A1* | 3/2015 | McWithey | ............... | B60Q 1/12 701/36 |
| 2017/0225735 A1* | 8/2017 | Saez Lopez | ............... | B62J 6/02 |
| 2018/0043959 A1* | 2/2018 | Yasuhara | ................. | B62L 1/00 |
| 2018/0117961 A1* | 5/2018 | Ono | ........................ | B62K 19/38 |
| 2018/0127047 A1* | 5/2018 | Lankford | ................ | B60L 50/52 |
| 2018/0202876 A1* | 7/2018 | Binder | ..................... | B62M 6/50 |

FOREIGN PATENT DOCUMENTS

| | | | | |
|---|---|---|---|---|
| CN | 103068669 A | | 4/2013 | |
| CN | 203681728 U | | 7/2014 | |
| CN | 204956742 U | | 1/2016 | |
| CN | 105960366 A | | 9/2016 | |
| DE | 19817594 A1 | | 10/1999 | |
| DE | 19906208 A1 | | 8/2000 | |
| DE | 102012221188 A1 | | 5/2014 | |
| DE | 102013200157 A1 | | 7/2014 | |
| DE | 102015201537 A1 | | 8/2016 | |
| DE | 102015207330 A1 | | 10/2016 | |
| JP | H0558363 A | | 3/1993 | |
| JP | 2001027666 A | | 1/2001 | |
| JP | 2001027666 A | * | 1/2001 | |
| JP | 2008110683 A | | 5/2008 | |
| JP | 2015123840 A | | 7/2015 | |
| JP | 2017039487 A | | 2/2017 | |
| WO | 2004068074 A1 | | 8/2004 | |
| WO | WO-2014079697 A1 | * | 5/2014 | ......... B60R 21/0134 |

* cited by examiner

ENVIRONMENT SENSOR SYSTEM IN A TWO-WHEELED VEHICLE

FIELD OF THE INVENTION

The present invention relates to an environmental sensor system in a two-wheeled vehicle.

BACKGROUND INFORMATION

From German Published Patent Application No. 10 2015 201 537, it is known to situate a camera in the rear area of a motorcycle that records the area of the roadway behind the motorcycle. The angle of incline that the motorcycle assumes when driving through a curve can be taken into account in the representation of the area behind the vehicle in a display unit.

From German Published Patent Application No. 10 2015 201 537, it is known to situate a respective sensor fixedly at the two opposite ends of the handlebar of a motorcycle. From the temporal delays in signals sent out and received, the incline of the motorcycle can be ascertained and taken into account in the environmental recognition.

SUMMARY

The environmental sensor system according to the present invention can be used in two-wheeled vehicles for environmental observation. Using the environmental sensor system, for example objects or other vehicles in the environment surrounding the two-wheeled vehicle can be detected. In addition or alternatively, it is also possible to ascertain, for example, the course of the roadway via the environmental sensor system.

The environmental sensor system includes at least one sensor that, for environmental observation and object recognition, sends out and/or receives beams in the visible or non-visible range. The evaluation of the received information takes place either in an evaluation unit that is integrated into the environmental sensor system or in a separately fashioned regulating or control device with which the environmental sensor system communicates wirelessly or by cable. The environmental sensor system includes for example a radar, laser, or camera system.

The carrier unit of the environmental sensor system is made pivotable about at least one axis of the two-wheeled vehicle, and, when there is a deflection of the two-wheeled vehicle, pivots about the two-wheeled vehicle axis in a direction opposite to the deflection, thus executing a compensating movement and ensuring that the environmental sensor system is always in a horizontal or vertical orientation independent of the deflection about the two-wheeled vehicle axis.

The two-wheeled vehicle axis is advantageously the two-wheeled vehicle longitudinal axis about which the two-wheeled vehicle tilts when it travels through a curve and assumes an inclined position. The two-wheeled vehicle longitudinal axis runs through the points at which the wheels contact the roadway. Correspondingly, a compensating movement oriented opposite the inclined position can be executed via the carrier unit of the environmental sensor system.

This embodiment has the advantage that the environmental sensor system in the two-wheeled vehicle has an at least substantially, and preferably exactly, horizontal and vertical orientation even when traveling through a curve, with the associated inclined position of the two-wheeled vehicle. The environmental information recorded in the sensor system is thus recorded independent of the inclined position of the two-wheeled vehicle, in the same way as in a two-wheeled vehicle that is not inclined, which significantly simplifies the evaluation of the received information.

According to another advantageous embodiment, the two-wheeled vehicle axis is a transverse axis, and the deflection of the two-wheeled vehicle about the transverse axis is a pitching movement that the two-wheeled vehicle executes for example when there is strong deceleration or acceleration. In this case as well, it is useful that the carrier unit carries out a compensating movement oriented opposite to the deflection about the transverse axis, thus holding the environmental sensor system in the desired horizontal and vertical orientation.

Embodiments are also possible in which the carrier unit can carry out exactly one compensating movement about an axis of the two-wheeled vehicle, for example about the two-wheeled vehicle longitudinal axis or alternatively about the two-wheeled vehicle transverse axis. In addition, embodiments are also possible in which the carrier unit executes a compensating movement oriented opposite to the respective deflection both about the two-wheeled vehicle longitudinal axis and about the two-wheeled vehicle transverse axis.

According to a further advantageous embodiment, a component of a pivotable headlight of the two-wheeled vehicle forms the carrier unit. The pivotable headlight executes a compensating movement about at least one two-wheeled vehicle axis, and if warranted executes a compensating movement both about the two-wheeled vehicle longitudinal axis and about the two-wheeled vehicle transverse axis, so that the headlight remains horizontally and vertically oriented during travel through a curve and the inclined position assumed by the two-wheeled vehicle, and/or in the case of stronger pitching movements, in particular during acceleration or deceleration. The use of a component of the pivotable headlight that executes this compensating movement as carrier unit for the environmental sensor system means that a separate pivoting mechanism for the compensating movement of the environmental sensor system can be omitted.

The environmental sensor system can be integrated either immediately in the headlight unit of the pivotable headlight or in the pivot mechanism of the pivotable headlight. Correspondingly, either the headlight unit or the pivot mechanism forms the carrier unit for the environmental sensor system.

In an alternative embodiment, it is also possible for the environmental sensor system to be provided with a separate pivot mechanism realized independently of the headlight of the two-wheeled vehicle. This makes it possible to use a correspondingly pivotable environmental sensor system even in two-wheeled vehicles that are not equipped with a pivotable headlight.

According to another useful embodiment, the carrier unit for the environmental sensor system is fashioned as an active assembly and has an actuator upon actuation of which the carrier unit can be set into a pivot position oriented opposite the deflection of the two-wheeled vehicle. Advantageously, the two-wheeled vehicle has a sensor system that records vehicle state variables via which for example current vehicle acceleration or deceleration, and advantageously also the current position of incline of the vehicle, can be ascertained. This sensor information can be processed in a regulating or control device or an evaluation unit in which actuating signals for controlling the actuator are produced so that the actuator can set the carrier unit into a pivot position oriented opposite the deflection of wheeled vehicle.

In an alternative embodiment, it is also possible for the carrier unit to be realized as a passive assembly, for example one that can be swung out. In this case, it is not necessary to use an actuator to pivot the carrier unit in the direction opposite to the deflection of the two-wheeled vehicle.

In addition, the present invention relates to a headlight-environmental sensor system combination, the environmental sensor system being realized as described above. The headlight is made pivotable and can be pivoted about at least one axis of the two-wheeled vehicle, preferably about two axes of the two-wheeled vehicle. A component of the pivotable headlight that also executes the pivoting movement forms the carrier unit for the environmental sensor system.

DETAILED DESCRIPTION

Figure 1:
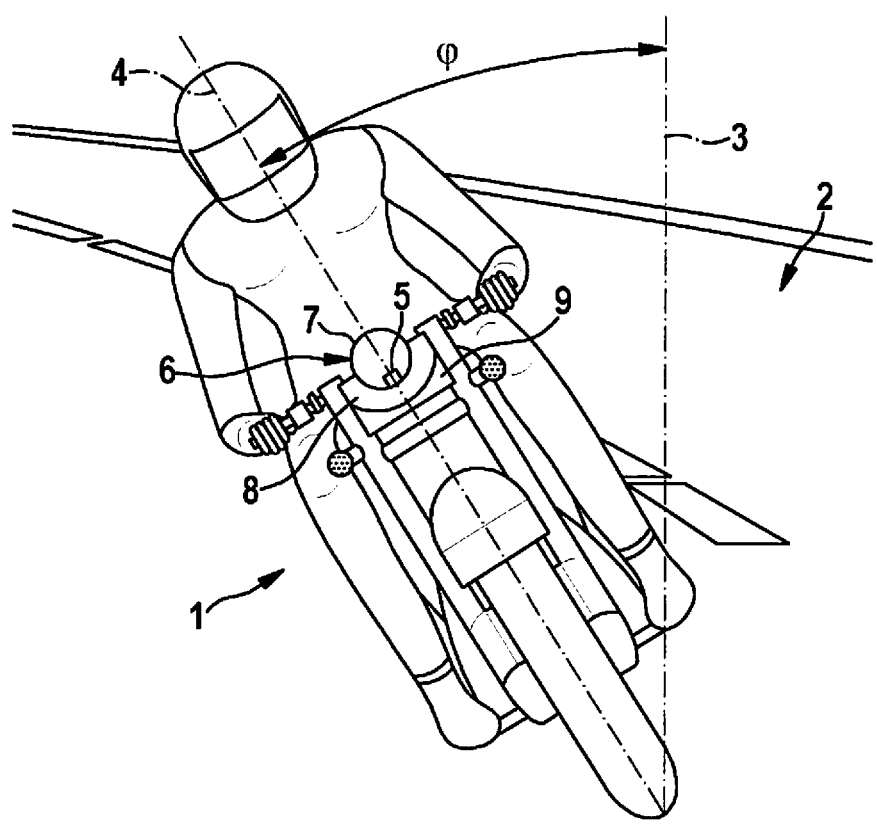
FIG. 1 shows a representation of a motorcycle in an inclined position when traveling through a curve, the motorcycle having a pivotable headlight having an integrated environmental sensor system.

In the Figures, identical components are provided with identical reference characters.

FIG. 1 shows a motorcycle 1 that is traveling through a curve on a roadway 2 and has assumed an inclined position. The angle of incline $\varphi$ characterizes the angle between a vertical 3 and a vehicle center plane 4. Angle of incline $\varphi$ is a function of the curve radius and the speed of the motorcycle.

Motorcycle 1 is equipped with an environmental sensor system 5 that is capable of acquiring persons, objects, and vehicles in the surrounding environment of motorcycle 1, and, if warranted, can also acquire the course of the roadway. Environmental sensor system 5 is mounted pivotably in motorcycle 1 and can execute pivot movements about two pivot axes: on the one hand, a pivot movement about the motorcycle longitudinal axis, or a parallel to the motorcycle longitudinal axis, and on the other hand a pivot about the motorcycle transverse axis in order to compensate pitching movements.

Environmental sensor system 5 is integrated into headlight 6 of the motorcycle, which is realized as a so-called curve light, and, via a pivot mechanism, is capable of compensating on the one hand an angle of incline and on the other hand pitching movements of the motorcycle with a deflection about the motorcycle transverse axis. Environmental sensor system 5 is fixedly connected to a pivotable component of headlight 6, and therefore executes the same compensating movement as headlight 6. In this way, it is ensured that environmental sensor system 5, analogous to headlight 6, is always in a horizontal and vertical orientation independent of the current angle of incline and current pitch angle of the motorcycle.

Environmental sensor system 5 acquires the surrounding environment in the area in front of motorcycle 1 and in the area to the sides. Environmental sensor system 5 includes for example a radar, laser, and/or camera system.

Figure 2:
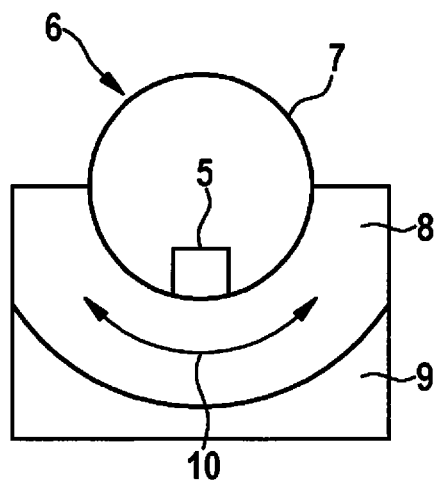
FIG. 2 shows the pivotable headlight having the environmental sensor system in the headlight unit, in a view from the front.
Figure 3:
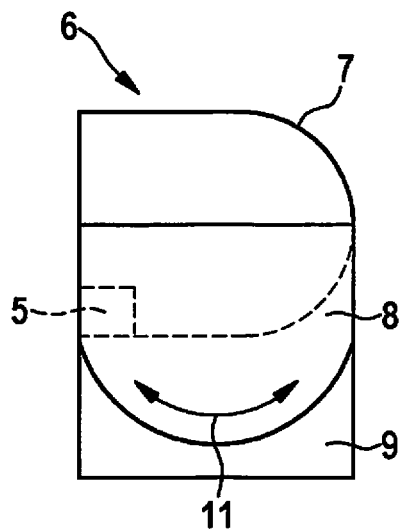
FIG. 3 shows the headlight according to FIG. 2 in a side view.

In FIGS. 2 and 3, headlight 6, with integrated environmental sensor system 5, is shown in a front view or in a side view respectively. Headlight 6 includes a headlight unit 7 having an illuminating device accommodated therein, and a pivot mechanism 8 that is the carrier of headlight unit 7 and can execute a pivot movement in two different directions relative to a fastening part 9. Fastening part 9 of headlight 6 is situated fixedly in the frame of the motorcycle.

According to FIGS. 1 and 2, pivot mechanism 8 permits a pivot according to arrow 10 about the vehicle longitudinal axis and, as shown in FIG. 3, about the vehicle transverse axis according to arrow 11. Pivot mechanism 8 can be actively equipped with an actuator that, as a function of the position of incline and the pitch angle, sets pivot mechanism 8 into a desired horizontal and vertical orientation. A passive realization of pivot mechanism 8, not having an actuator, is also possible, in which pivot mechanism 8 is oriented horizontally and vertically solely by the force of gravity and its mounting in fastening part 9.

Figure 4:
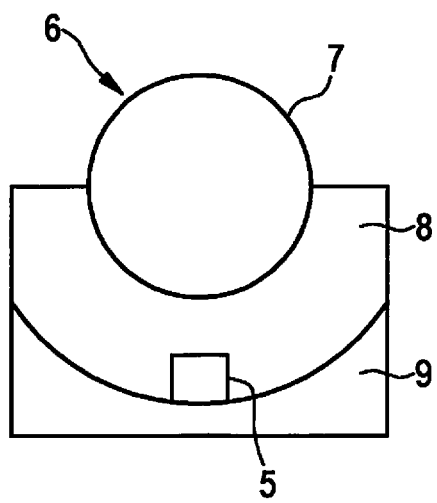
FIG. 4 shows the headlight in a front view, having an environmental sensor system that is integrated into the pivot mechanism of the headlight.

FIG. 4 shows a variant embodiment in which environmental sensor system 5 is not integrated in headlight unit 7, but rather is integrated in pivot mechanism 8. Headlight 6 has the same design as in the preceding exemplary embodiment and can execute a compensating movement both in an inclined position and also when there is a pitch angle of the motorcycle.

In FIGS. 2 and 3, headlight unit 7 of headlight 6 forms the carrier unit for environmental sensor system 5. In contrast, in FIG. 4 pivot mechanism 8 of headlight 6 forms the carrier unit for environmental sensor 5.

The environmental sensor signals received in environmental sensor 5 can, on the one hand, be processed in an evaluation unit that is integrated in the environmental sensor system and can subsequently be supplied for example to a regulating or control device in the motorcycle as input signals. An embodiment is also possible in which the environmental sensor signals are communicated immediately by environmental sensor system 5 to a regulating or control device in the motorcycle for evaluation and further processing. The communication of the signals to the regulating or control device takes place either by radio or via a data line.

What is claimed is:

1. An environmental sensor system in a two-wheeled vehicle, comprising:
   a carrier unit via which the environmental sensor system is coupled to the two-wheeled vehicle, wherein the carrier unit, when installed in or on the two-wheeled vehicle, is pivotable about each of two perpendicular axes of the two-wheeled vehicle, such that, when a deflection of the two-wheeled vehicle occurs about either of the two perpendicular axes, the carrier unit pivots about the respective axis of the two-wheeled vehicle in a direction opposite the deflection.

2. The environmental sensor system as recited in claim 1, wherein one of the axes is a longitudinal axis of the two-wheeled vehicle, such that, when the two-wheeled vehicle travels through a curve and therefore pivots about the longitudinal axis, the carrier unit is pivotable in a direction opposite a position of incline of the two-wheeled vehicle.

3. The environmental sensor system as recited in claim 1, wherein one of the axes is a transverse axis of the two-wheeled vehicle that is perpendicular to a longitudinal axis of the two-wheeled vehicle, the longitudinal axis extending from a rear of the two-wheeled vehicle towards a front of the two-wheeled vehicle, such that, when the two-wheeled vehicle pitches about the transverse axis, the carrier unit pivots about the transverse axis in a direction opposite the pitching of the two-wheeled vehicle.

4. The environmental sensor system as recited in claim 1, wherein the carrier unit is a component of a pivotable headlight of the two-wheeled vehicle.

5. The environmental sensor system as recited in claim 4, wherein the component is a pivot mechanism of the pivotable headlight.

6. The environmental sensor system as recited in claim 4, wherein the component is a headlight unit that is seated on a pivot mechanism of the pivotable headlight.

7. The environmental sensor system as recited in claim 2, wherein the carrier unit is realized as an active assembly that can be set, by an actuator, into a pivot position oriented opposite to the deflection of the two-wheeled vehicle.

8. The environmental sensor system as recited in claim 2, wherein the carrier unit is realized as a passive assembly, so that the pivoting of the carrier unit occurs automatically by force of gravity without motor force.

9. A headlight-environmental sensor system combination, comprising:
an environmental sensor system; and
a pivotable headlight via which the environmental sensor system is coupled to a two-wheeled vehicle, wherein the headlight, when installed in or on the two-wheeled vehicle, is pivotable about each of two perpendicular axis of the two-wheeled vehicle, such that, when a deflection of the two-wheeled vehicle occurs in either of the two perpendicular axes, the headlight pivots about the respective axis of the two-wheeled vehicle in a direction opposite the deflection.

10. A two-wheeled vehicle, comprising:
a first wheel at a front side of the two-wheeled vehicle;
a second wheel at a rear side of the two-wheeled vehicle;
a frame to which the first and second wheels are connected and that extends, in a direction of a longitudinal axis of the two-wheeled vehicle, from the rear side of the two-wheeled vehicle towards the front side of the two-wheeled vehicle; and
an environmental sensor system that includes a carrier unit via which the environmental sensor system is coupled to the frame of the two-wheeled vehicle, wherein the carrier unit is pivotable about a transverse axis that is perpendicular to the longitudinal axis of the two-wheeled vehicle, such that, when a deflection of the two-wheeled vehicle occurs that pitches the two-wheeled vehicle about the transverse axis of the two-wheeled vehicle, the carrier unit pivots about the transverse axis of the two-wheeled vehicle in a direction opposite the deflection.

11. The two-wheeled vehicle as recited in claim 10, wherein the carrier unit is a component of a pivotable headlight of the two-wheeled vehicle.

12. The two-wheeled vehicle as recited in claim 10, wherein the environmental sensor system communicates with a regulating or control device in the two-wheeled vehicle.

* * * * *